(12) United States Patent
Mahara

(10) Patent No.: US 12,436,290 B2
(45) Date of Patent: Oct. 7, 2025

(54) SENSOR CONTROL SYSTEM AND SENSOR

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 286 days.

(21) Appl. No.: 18/247,666

(22) PCT Filed: Aug. 25, 2021

(86) PCT No.: PCT/JP2021/031210
§ 371 (c)(1),
(2) Date: Apr. 3, 2023

(87) PCT Pub. No.: WO2022/080014
PCT Pub. Date: Apr. 21, 2022

(65) Prior Publication Data
US 2024/0019579 A1    Jan. 18, 2024

(30) Foreign Application Priority Data
Oct. 13, 2020    (JP) .................... 2020-172623

(51) Int. Cl.
*G01S 17/894*    (2020.01)
*G01S 7/497*    (2006.01)
(Continued)

(52) U.S. Cl.
CPC ............ *G01S 17/894* (2020.01); *G01S 7/497* (2013.01); *G01S 17/10* (2013.01); *G01S 17/86* (2020.01)

(58) Field of Classification Search
CPC ...... G01S 17/10; G01S 7/4863; G01S 17/931; G01S 7/4865; G01S 7/497; G01S 7/4817;
(Continued)

(56) References Cited

U.S. PATENT DOCUMENTS 10,585,175 B2 * 3/2020 Retterath .............. G01S 7/4817
2016/0352388 A1 12/2016 Lane
(Continued)

FOREIGN PATENT DOCUMENTS

DE    102018201302 A1    8/2019
JP    10-040491 A    2/1998
(Continued)

OTHER PUBLICATIONS

International Search Report and Written Opinion of PCT Application No. PCT/JP2021/031210, issued on Nov. 9, 2021, 12 pages of ISRWO.

*Primary Examiner* — Anthony S Addy
(74) *Attorney, Agent, or Firm* — CHIP LAW GROUP

(57) ABSTRACT

Provided is a sensor control system capable of reducing a load on an application system in processing of a synchronization signal and performing flexible synchronization control in accordance with a system change even if the system change such as an increase in the number of sensors is made. A sensor control system that includes a light emitting unit, a sensor including a signal processing unit that performs signal processing on the basis of an electric signal output from each of a plurality of pixels, and a control device that controls execution of the signal processing of the sensor. The sensor includes a communication interface processing unit that receives a communication interface signal, a synchronization signal generation unit that generates a synchronization signal, a light emission trigger output unit that transmits a light emission trigger on the basis of the synchronization signal, a synchronization signal processing (Continued)

unit that controls the signal processing unit on the basis of the synchronization signal and transmits the synchronization signal, and a feedback signal processing unit that receives a feedback signal and transmits predetermined signal processing data including a reception result to the control device.

15 Claims, 14 Drawing Sheets

(51) Int. Cl.
  *G01S 17/10* (2020.01)
  *G01S 17/86* (2020.01)
(58) Field of Classification Search
  CPC ...... G01S 17/36; G01S 13/865; G01S 17/894; G01S 15/86; G01S 17/42; G01S 17/003; G01S 17/86
  See application file for complete search history.

(56) References Cited

U.S. PATENT DOCUMENTS

| | | | |
|---|---|---|---|
| 2017/0280029 A1* | 9/2017 | Steiner | G06T 11/001 |
| 2018/0329063 A1* | 11/2018 | Takemoto | G01S 7/487 |
| 2020/0003862 A1 | 1/2020 | Doaré et al. | |
| 2020/0284887 A1* | 9/2020 | Wachter | G01S 7/4815 |
| 2021/0199781 A1* | 7/2021 | Jin | G01S 17/18 |

FOREIGN PATENT DOCUMENTS

| | | |
|---|---|---|
| JP | 2007-310741 A | 11/2007 |
| JP | 2017-527777 A | 9/2017 |
| JP | 2018-503833 A | 2/2018 |
| JP | 2020-513539 A | 5/2020 |

\* cited by examiner

FIG. 15A — LIGHT EMISSION REQUEST from CIS(Tof) (1) to CIS(Tof) (2)

FIG. 15B — LIGHT EMISSION REQUEST from CIS(Tof) (2) to CIS(Tof) (3)

FIG. 15C — FB SIGNAL from CIS(Tof) (3) to CIS(Tof) (1)

IN CASE WHERE Frame SYNCHRONIZATION, ETC. IS SUFFICIENTLY FREE

OK IF FB SIGNAL IS INPUT WITHIN
CERTAIN FIXED PERIOD, OR NG IF NOT

NG IF THERE ARE TWO OR MORE
INPUTS FOR ONE OUTPUT

IN CASE WHERE OVERTAKING IS LIKELY TO OCCUR IF DELAY PROCESSING DESCRIBED ABOVE IS
PERFORMED DUE TO PULSES OUTPUT IN SHORT PERIOD

MECHANISM THAT ENABLES OUTPUT OF
FB SIGNAL SYNCHRONIZED WITH INPUT SIGNAL AS Slave IS PROVIDED Slave SYNCHRONIZATION SIGNAL HOLD NUMBER OF OUTPUT PULSES IN UNIT OF 1 AS EXPECTED VALUE AND COMPARE EXPECTED VALUE WITH NUMBER OF INPUT PULSES AT TIME POINT WHEN PULSE OUTPUT IS COMPLETED IN UNIT OF 1
OK IF BOTH ARE IDENTICAL, OR NG IF BOTH ARE DIFFERENT

SENSOR CONTROL SYSTEM AND SENSOR

CROSS REFERENCE TO RELATED APPLICATIONS

This application is a U.S. National Phase of International Patent Application No. PCT/JP2021/031210 filed on Aug. 25, 2021, which claims priority benefit of Japanese Patent Application No. JP 2020-172623 filed in the Japan Patent Office on Oct. 13, 2020. Each of the above-referenced applications is hereby incorporated herein by reference in its entirety.

TECHNICAL FIELD

The technology according to the present disclosure (the present technology) relates to a sensor control system and a sensor.

BACKGROUND ART

In recent years, a technology for recognizing a target in an image detected by a sensor has been known. In such a target recognition technology, an image sensor, a millimeter wave radar, and a laser radar are generally used (for example, Patent Document 1). Moreover, in recent years, time of flight (ToF) sensor that measures a distance to an object (target) on the basis of a time of flight of light has been used.

As the ToF sensor, a direct ToF (dToF) type distance measurement sensor that measures a distance from a time of flight of light directly measured using a pulse wave, and an indirect ToF (iToF) type distance measurement sensor that measures a distance from a time of flight of light indirectly calculated using a phase of modulated light are known.

Meanwhile, the ToF sensor described above needs to be synchronized with a light emitting unit in units of ps/ns, and needs to be synchronized with an external device such as a scanning device in addition to the light emitting unit. In such a ToF sensor, a higher-level application system generates synchronization signals for the light emitting unit and the external device including the ToF sensor, and manages the synchronization signals.

CITATION LIST

Patent Document

Patent Document 1: Japanese Patent Application Laid-Open No. 2007-310741

SUMMARY OF THE INVENTION

Problems to be Solved by the Invention

As described above, in the ToF sensor, the processing of the synchronization signal is often performed by the application system, and the application system is required to perform high-speed processing in real time.

In the future, it is assumed that the processing of the synchronization signal becomes complicated due to an increase in the number of sensors. In such a case, if the number of synchronization signals to be generated and managed by the application system increases, the management becomes difficult, and it is difficult to cope with the occurrence of an error such as noise.

The present disclosure has been made in view of such circumstances, and an object of the present disclosure is to provide a sensor control system and a sensor capable of reducing a load on an application system in processing of a synchronization signal and performing flexible synchronization control in accordance with a system change even if the system change such as an increase in the number of sensors is made.

Solutions to Problems

One aspect of the present disclosure is a sensor control system including: a light emitting unit that irradiates a target area with light; a sensor that includes a plurality of pixels each of which receives reflected light from the target area and converts the reflected light into an electric signal and a signal processing unit which performs signal processing on the basis of the electric signal output from each of the pixels; and a control device that is connectable to the sensor and controls execution of the signal processing of the sensor, the sensor including a communication interface processing unit that receives a communication interface signal necessary for control related to the signal processing from an external device, a synchronization signal generation unit that generates a synchronization signal for synchronization with the signal processing on the basis of the communication interface signal, a light emission trigger output unit that transmits a light emission trigger for irradiation of the light emitting unit with light on the basis of the synchronization signal, a synchronization signal processing unit that controls the signal processing unit on the basis of the synchronization signal and transmits the synchronization signal to a connectable external device, and a feedback signal processing unit that receives a feedback signal returned from the light emitting unit in response to the light emission trigger, receives a feedback signal returned from the external device in response to the synchronization signal, and transmits predetermined signal processing data including a reception result to the control device.

Another aspect of the present disclosure is a sensor including: a plurality of pixels each of which receives reflected light from a target area and converts the reflected light into an electric signal, the target area being irradiated with light by a light emitting unit; a signal processing unit that performs signal processing on the basis of the electric signal output from each of the pixels; a communication interface processing unit that receives a communication interface signal necessary for control related to the signal processing from an external device; a synchronization signal generation unit that receives a synchronization signal for synchronization with the signal processing on the basis of the communication interface signal; a light emission trigger output unit that transmits a light emission trigger for irradiation of the light emitting unit with light on the basis of the synchronization signal; a synchronization signal processing unit that controls the signal processing unit on the basis of the synchronization signal and transmits the synchronization signal to a connectable external device; and a feedback signal processing unit that receives a feedback signal returned from the light emitting unit in response to the light emission trigger, receives a feedback signal returned from the external device in response to the synchronization signal, and transmits a reception result in a state of being included in predetermined signal processing data to a control device that controls execution of the signal processing.

Moreover, still another aspect of the present disclosure is a sensor including: a plurality of pixels each of which receives reflected light from a target area and converts the reflected light into an electric signal, the target area being irradiated with light by a light emitting unit; a signal processing unit that performs signal processing on the basis of the electric signal output for each of the pixels; a communication interface processing unit that receives a communication interface signal necessary for control related to the signal processing; a synchronization signal reception unit that receives a synchronization signal for synchronization with the signal processing from an external device; a light emission trigger output unit that transmits a light emission trigger for irradiation of the light emitting unit with light on the basis of the synchronization signal; and a synchronization signal processing unit that controls the signal processing unit on the basis of the synchronization signal and transmits the synchronization signal to a connectable external device.

BRIEF DESCRIPTION OF DRAWINGS

FIGS. 15A, 15B, and 15C are timing charts illustrating an error determination operation of a distance measurement sensor serving as a master according to the seventh embodiment.

MODE FOR CARRYING OUT THE INVENTION

Hereinafter, embodiments of the present disclosure will be described with reference to the drawings. The same or similar portions will be denoted by the same or similar reference signs in the description of the drawings referred to in the following description, and the redundant description thereof will be omitted.

Note that the effects described in the present specification are merely examples and are not limited, and there may be other effects.

First Embodiment

<Configuration of Distance Measurement Sensor>

Figure 1:
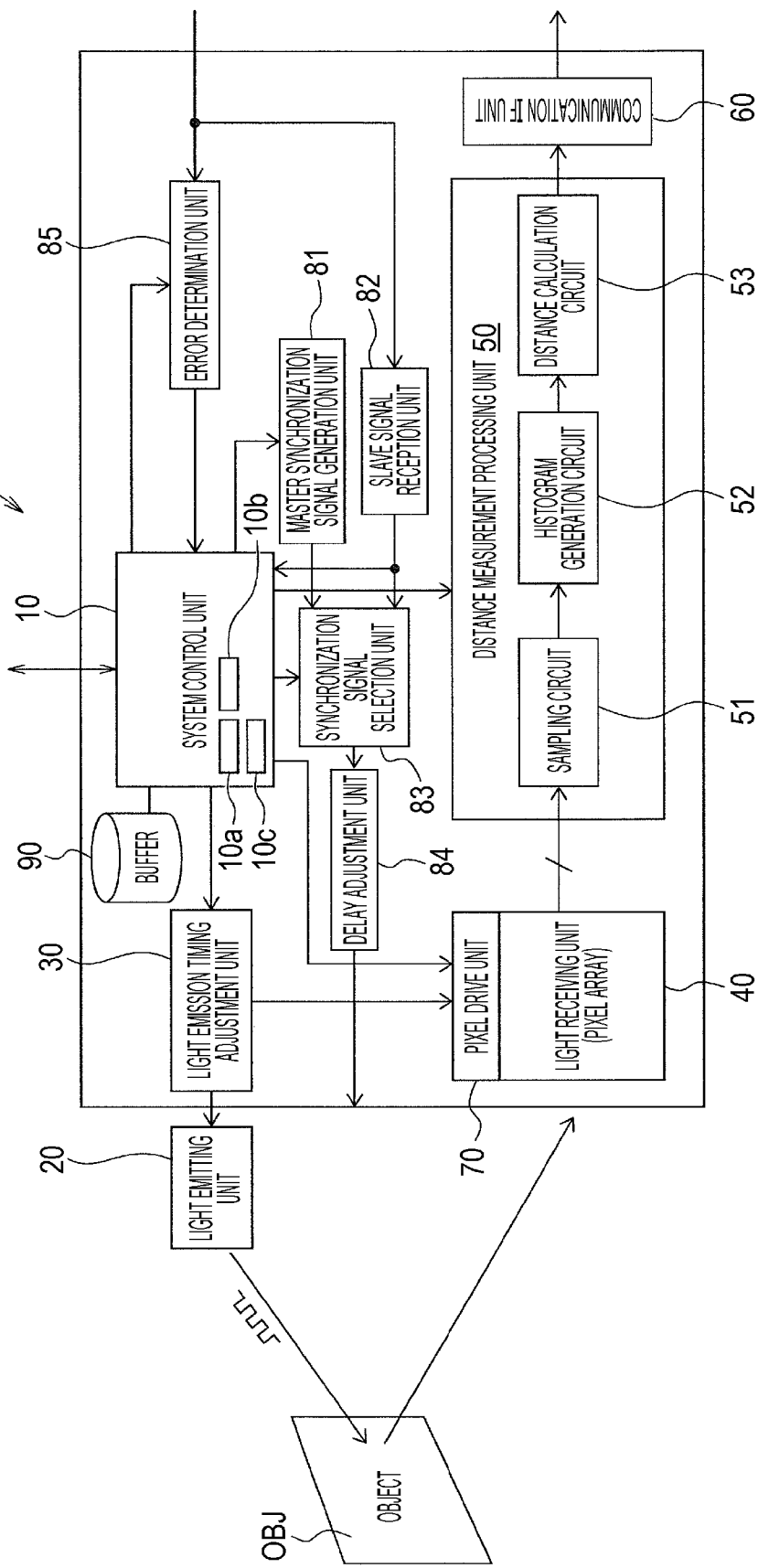
FIG. 1 is a block diagram illustrating an example of a configuration of a distance measurement sensor according to a first embodiment of the present technology.

FIG. 1 is a block diagram illustrating an example of a configuration of a distance measurement sensor 1 according to a first embodiment of the present technology. In the first embodiment of the present technology, the distance measurement sensor 1 is, for example, a dToF sensor. The distance measurement sensor 1 is a distance measurement sensor that measures a distance to an object OBJ (target or subject) on the basis of an electric signal obtained by emitting pulsed light from a light emitting element and receiving reflected light from the object OBJ irradiated with the pulsed light by a light receiving element.

As illustrated in the drawing, the distance measurement sensor 1 includes, for example, components such as a system control unit 10, a light emitting unit 20, a light emission timing adjustment unit 30, a light receiving unit 40, and a distance measurement processing unit 50. These components can be integrally configured as a system on chip (SoC) such as a CMOS LSI, for example, but some components, such as the light emitting unit 20 and the light receiving unit 40, may be configured as separate LSIs, for example. The distance measurement sensor 1 operates according to an operation clock (not illustrated). Furthermore, the distance measurement sensor 1 includes a communication interface unit 60 configured to output data (distance measurement data) related to the distance calculated by the distance measurement processing unit 50 to the outside. Although not illustrated, the distance measurement sensor 1 is configured to be capable of communicating with a host IC arranged outside via the communication interface unit 60.

The system control unit 10 is a component that performs overall control of the operation of the distance measurement sensor 1. Typically, the system control unit 10 includes a microprocessor.

The light emitting unit 20 emits pulsed light such as infrared light (IR) toward a target area. The light emission timing adjustment unit 30 is a circuit that adjusts a light emission timing of the light emitting unit 20. For example, the light emission timing adjustment unit 30 outputs a trigger pulse so as to be synchronized with a read timing for each line from the light receiving unit 40 to be described later, thereby driving the light emitting unit 20.

The light receiving unit 40 is a sensor that outputs an electric signal in response to light incident from the target area. The incident light includes the reflected light from the object OBJ. In the present disclosure, the light receiving unit 40 is a CMOS image sensor constituted by a plurality of pixels including a plurality of light receiving elements arranged in a two-dimensional matrix. In the present disclosure, a specific pixel group (for example, a pixel group in one line direction in an imaging frame) is enabled, for example, under the control of the system control unit 10, whereby an electric signal is read out. Furthermore, pixel groups of the respective lines are sequentially enabled in one frame time, and one imaging frame for the target area is formed by the electric signals respectively output from the enabled pixel groups.

The distance measurement processing unit 50 is a component that calculates the distance to the object OBJ on the basis of the pulsed light emitted from the light emitting unit 20 and the reflected light received by the light receiving unit 40. The distance measurement processing unit 50 is typically configured using a signal processing processor. In the present disclosure, the distance measurement processing unit 50 includes a sampling circuit 51, a histogram generation circuit 52, and a distance calculation circuit 53.

The sampling circuit 51 is a component that samples an electric signal output from a specific pixel group in response to emission of pulsed light at a predetermined sampling frequency. For example, the sampling circuit 51 outputs a high or low value (sampling value) according to a value of the electric signal output from each of the enabled pixel groups.

The histogram generation circuit 52 is a component that generates a histogram indicating the intensity of reflected light for each time on the basis of a total value of sampling values for each sampling time output by the sampling circuit 51. The histogram is held as a kind of data structure or a table on a memory (not illustrated), for example. The histogram is generated as many as a number corresponding to the number of pixels on the basis of pulsed light emitted for each read line in the imaging frame. The histogram generated by the histogram generation circuit 52 is referred to by the distance calculation circuit 53.

The distance calculation circuit 53 is a component that detects a peak value in the histogram with reference to the generated histogram and calculates a distance from time (that is, arrival time) corresponding to the peak value. That is, if it is assumed that reflected light at the time of irradiating the object OBJ with emitted pulsed light is received, the time is a round-trip time to the object OBJ, and thus, the distance to the object OBJ can be calculated for each pixel by multiplying this time by c/2 (c is the speed of light). Therefore, a distance image can be obtained from the distances calculated for all the pixels constituting the imaging frame. The distance calculation circuit 53 outputs data (distance measurement data) related to the distances calculated for each pixel in each of the imaging frames to the communication interface unit 60.

The communication interface unit 60 is an interface circuit configured to output the calculated distance measurement data to an external host IC. For example, the communication interface unit 60 is an interface circuit conforming to a mobile industry processor interface (MIPI), but is not limited thereto. For example, the communication interface unit 60 may be a serial peripheral interface (SPI), an LVDS, an SLVS-EC, or the like, or may be equipped with some of these interface circuits.

Meanwhile, in the first embodiment, the system control unit 10 includes a communication interface signal processing unit 10*a*, a frame synchronization signal reception unit 10*b*, and a frame synchronization signal processing unit 10*c*. Moreover, a master synchronization signal generation unit 81, a slave signal reception unit 82, a synchronization signal selection unit 83, a delay adjustment unit 84, and an error determination unit 85 are provided.

The communication interface signal processing unit 10*a* receives a communication interface signal necessary for distance measurement processing performed by the distance measurement processing unit 50 from an application system (whose details will be described later). The frame synchronization signal reception unit 10*b* receives a frame synchronization signal, synchronized with an imaging frame formed by a plurality of pixels, from the application system. When the distance measurement sensor 1 is set as the master, the frame synchronization signal processing unit 10*c* outputs the frame synchronization signal to the master synchronization signal generation unit 81.

The master synchronization signal generation unit 81 generates a line synchronization signal having a cycle shorter than that of the frame synchronization signal from the frame synchronization signal. This line synchronization signal is transmitted to an external distance measurement sensor or imaging position changing device (whose details will be described later) via the synchronization signal selection unit 83 and the delay adjustment unit 84. Furthermore, the master synchronization signal generation unit 81 may be configured to generate a frame synchronization signal even in a case where the frame synchronization signal is not transmitted from the application system. When the distance measurement sensor 1 is set as a slave, the slave signal reception unit 82 receives a frame synchronization signal from a master and outputs the received frame synchronization signal to the system control unit 10, and, in a case where there is a slave to be connected next, transmits the received frame synchronization signal to the next slave via the synchronization signal selection unit 83 and the delay adjustment unit 84, and transmits a feedback signal for the received frame synchronization signal to the master via the synchronization signal selection unit 83 and the delay adjustment unit 84 if the master is connected next. The synchronization signal selection unit 83 selectively derives an output of the master synchronization signal generation unit 81 and an output of the slave signal reception unit 82 under the control of the system control unit 10. The delay adjustment unit 84 can adjust a delay time, for example, under the control of the system control unit 10 or manually.

In a case where the distance measurement sensor 1 is set as the master, the error determination unit 85 receives a feedback signal returned from the light emitting unit 20, receives a feedback signal returned from the imaging position changing device, performs error determination, and outputs an error determination result to the system control unit 10. Then, the system control unit 10 transmits the error determination result to the application system.

Furthermore, the error determination unit 85 receives a feedback signal from a slave, compares a frame synchronization signal with the feedback signal to perform error determination, and outputs an error determination result to the system control unit 10. Then, the system control unit 10 transmits the error determination result to the application system. Note that, as a method for the error determination, notification of an error is provided if no feedback signal is returned within a range in which an exposure time, a wiring delay, and the like are taken into consideration since initiation of a frame synchronization signal. Furthermore, a time required from transmission of a light emission request to reception of a feedback signal in response to the light emission request is measured, and notification of an error is provided in a case where the feedback signal is not received within a predetermined time.

Furthermore, a buffer 90 is connected to the system control unit 10. The buffer 90 stores a value rewritable from the outside for communication data. The system control unit 10 has a function of enabling transmission of a content stored in the buffer 90 by a master operation such as an SPI/I2C and a function of writing a received content in the buffer 90 during a read operation. Furthermore, the system control unit 10 can select a timing at which the content stored in the buffer 90 is transmitted/received from each synchronization signal. Moreover, the system control unit 10 outputs a set value stored in the buffer 90 to the error determination unit 85 such that expected value determination with a received feedback signal is performed.

<Configuration of Light Receiving Unit>

Figure 2:
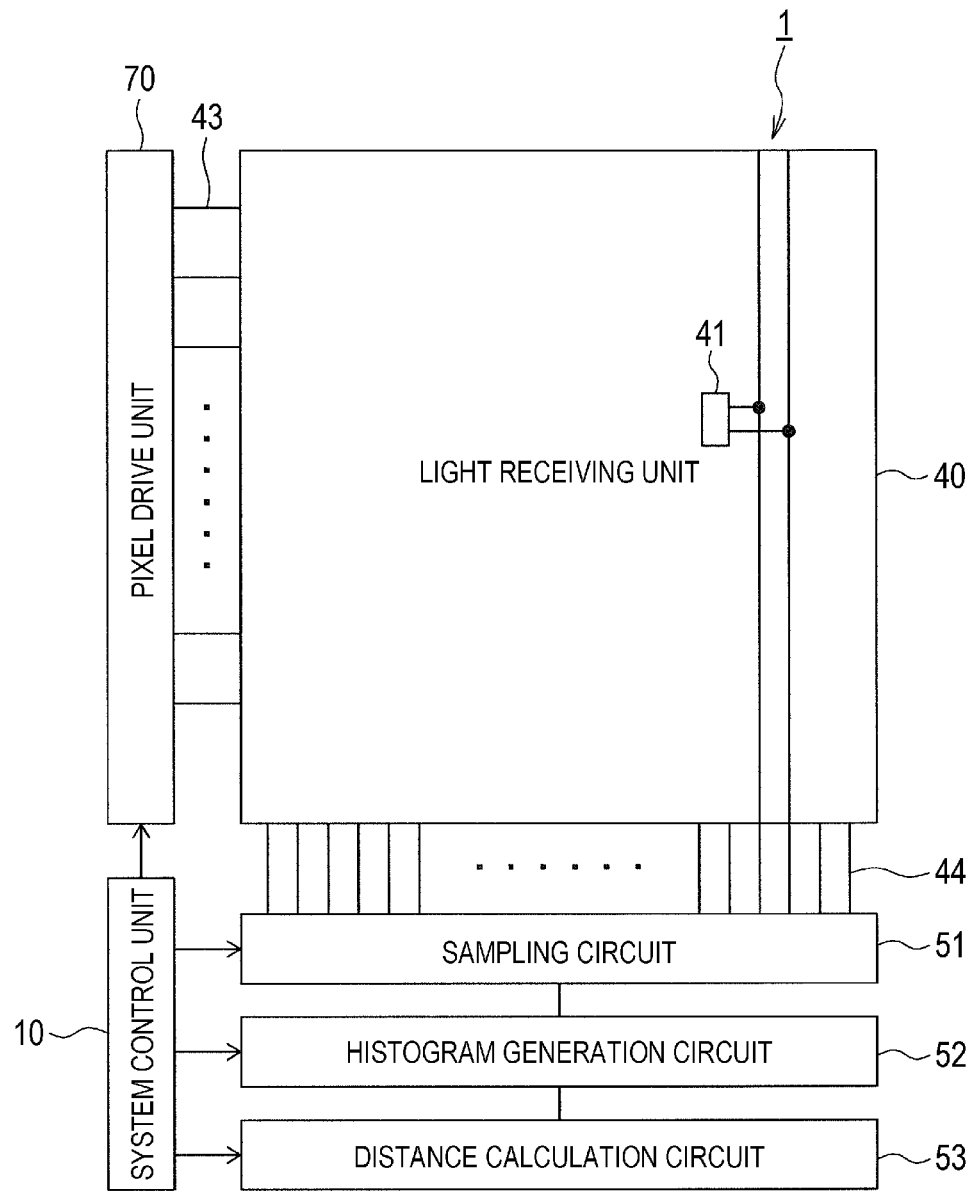
FIG. 2 is a block diagram illustrating an example of a configuration of a light receiving unit according to the first embodiment.

FIG. 2 illustrates one pixel 41 among the plurality of pixels arranged in the two-dimensional matrix in the light receiving unit 40. The pixel 41 includes a photoelectric conversion element that photoelectrically converts received light and generates a charge according to the amount of the light.

A pixel drive unit 70 is connected to the light receiving unit 40 via a pixel drive line 43. The pixel drive unit 70 drives all the pixels of the light receiving unit 40 at the same time or drives each of the pixels in units of rows. A pixel signal output from each of pixels of a pixel line (pixel row) selectively scanned by the pixel drive unit 70 is supplied to the sampling circuit 51 through each of vertical signal lines 44.

The sampling circuit 51 samples a pixel signal output from each pixel unit of a selected line (selected row) through the vertical signal line 44 at a predetermined sampling frequency for each pixel column of the light receiving unit 40.

Figure 3:
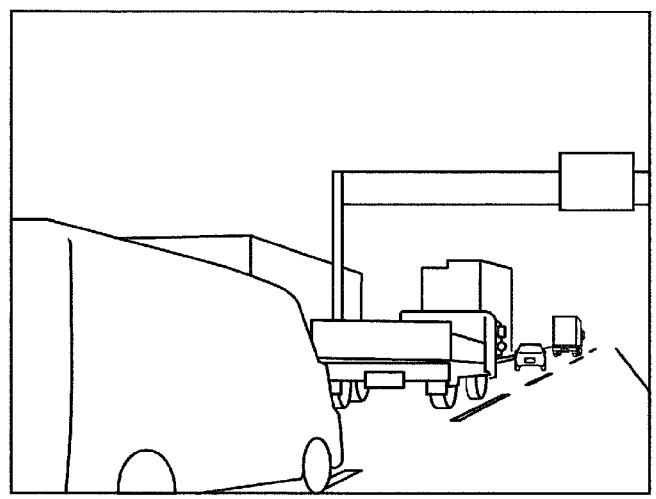
FIG. 3 is a view illustrating an example of an imaging frame configured by the light receiving unit according to the first embodiment.

In this manner, for example, in a scene in front of a vehicle as illustrated in FIG. 3, the distance measurement sensor 1 can more accurately avoid a collision or the like by measuring a distance to a nearby obstacle (for example, another vehicle) with higher distance measurement accuracy. On the other hand, in a case where there is no obstacle (for example, other vehicle) nearby as a result of the distance measurement, a power supply that supplies power to the pixel 41 is turned off or the pixel signal output from the pixel 41 is masked, so that a driving voltage of the pixel and a calculation load of the processor are lowered, and power consumption can be suppressed.

<Configuration of Sensor Control System>

Figure 4:
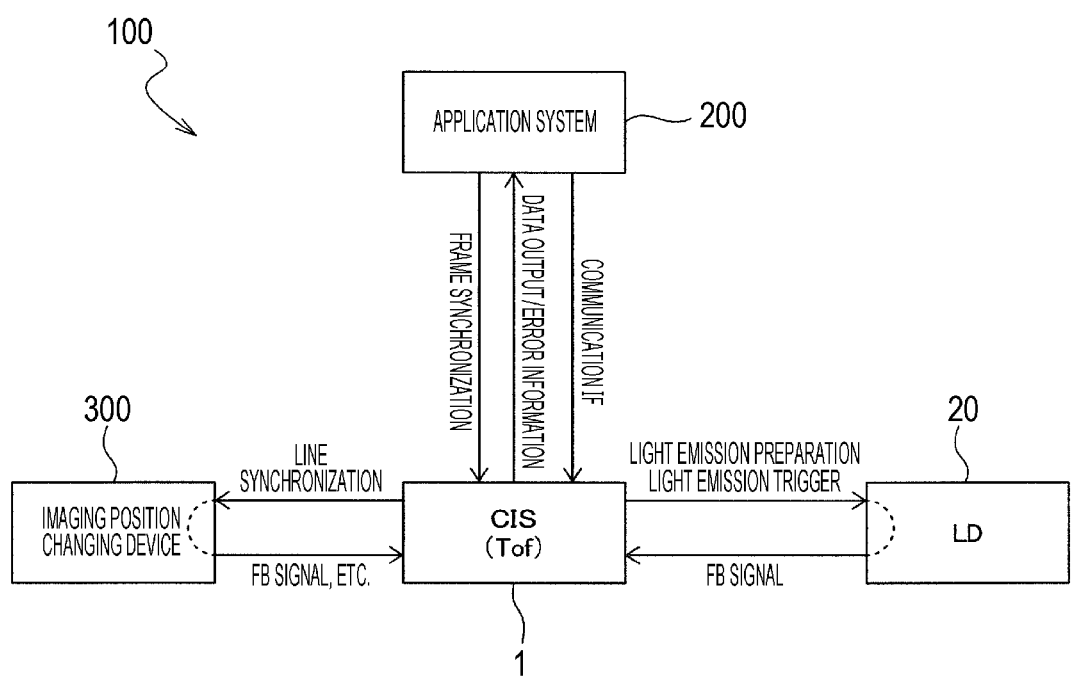
FIG. 4 is a block diagram illustrating an example of a configuration of a sensor control system according to the first embodiment of the present technology.

FIG. 4 is a block diagram illustrating an example of a configuration of a sensor control system 100 according to the first embodiment of the present technology.

Figure 5:
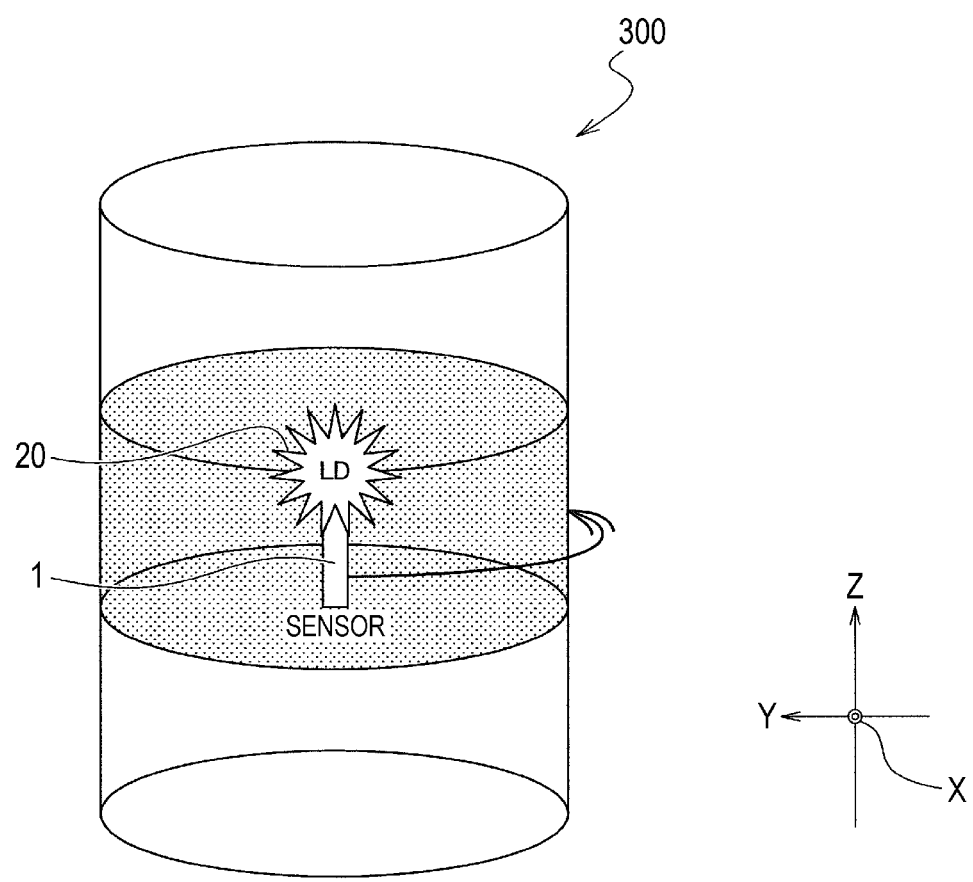
FIG. 5 is a perspective view illustrating an example of an imaging position changing device according to the first embodiment.

In the sensor control system 100, the distance measurement sensor 1 can be connected to an application system 200 and an imaging position changing device 300. The application system controls execution of the distance measurement processing of the distance measurement sensor 1. As illustrated in FIG. 5, the distance measurement sensor 1 and the light emitting unit 20 are supported by the imaging position changing device 300 so as to be rotatable about a Z-axis arrow in FIG. 5. The imaging position changing device 300 includes a rotation axis about the Z-axis arrow in FIG. 5 and is controlled by the distance measurement sensor 1. Note that the imaging position changing device 300 may include, for example, a rotation axis about a Y-axis arrow in FIG. 5. Furthermore, a rate gyro, for example, is attached to each rotation axis.

Returning to FIG. 4, the distance measurement sensor 1 receives a communication interface signal from the application system 200. The communication interface signal includes identification information for identifying the application system 200, command information for outputting distance measurement data, a movement amount relative to the imaging position changing device 300, and the like.

Subsequently, the distance measurement sensor 1 receives a frame synchronization signal illustrated in FIG. 6A from the application system 200. Then, the distance measurement sensor 1 generates a line synchronization signal illustrated in FIG. 6B from the frame synchronization signal and transmits the line synchronization signal to the imaging position changing device 300. Furthermore, the distance measurement sensor 1 controls the imaging position changing device 300 on the basis of a targeted direction, obtained by the distance measurement processing unit 50 from the command information included in the communication interface signal, and angle information obtained by the rate gyros provided on the respective rotation axes. Moreover, the distance measurement sensor 1 generates another synchronization signal illustrated in FIG. 6C from the frame synchronization signal, generates a light emission trigger (light emission request) illustrated in FIG. 6D, and transmits the light emission trigger to the light emitting unit 20.

Thereafter, the distance measurement sensor 1 receives a feedback signal for the transmission of the line synchronization signal from the imaging position changing device 300, and receives a feedback signal for the light emission trigger from the light emitting unit 20. When each of the feedback signals is received, the distance measurement sensor 1 performs error determination as to whether or not the feedback signal has been returned within a predetermined time since the initiation of the line synchronization signal, and transmits a result of the error determination to the application system 200 in the state of being included in predetermined distance measurement data illustrated in FIG. 6E.

Figure 6:
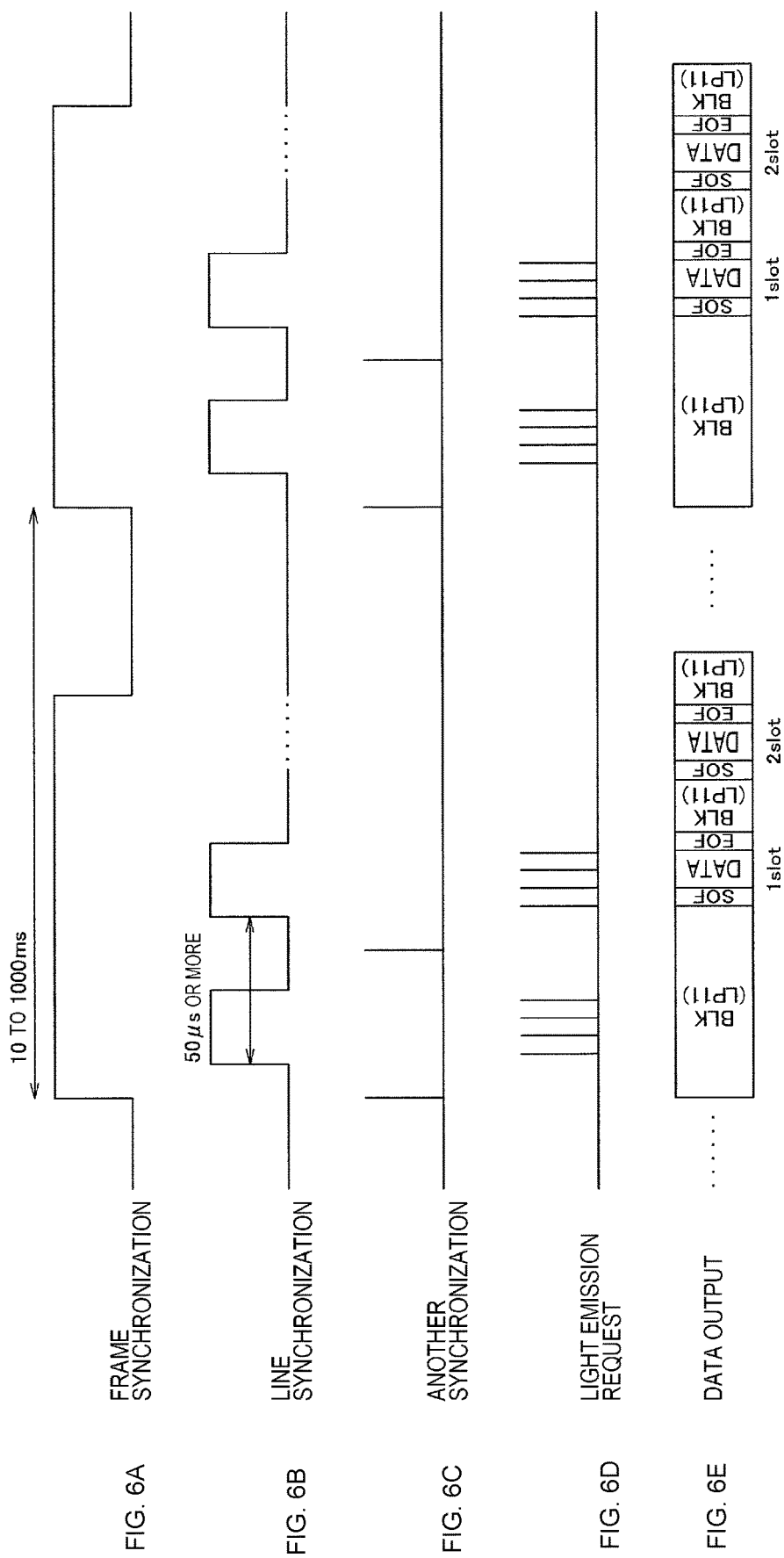
FIGS. 6A, 6B, 6C, 6D, and 6E are timing charts for describing an operation of a distance measurement sensor according to the first embodiment.

The distance measurement data illustrated in FIG. 6E is configured as, for example, a data sequence for one imaging frame. Such a data sequence includes, for example, in synchronization with the line synchronization signal, a blanking period (BLK) in which no data is inserted, a start code (SOF), a slot into which distance measurement data for each of the pixels 41 is inserted, and an end code (EOF). The slot number corresponds to a number of the pixel 41 according to scanning.

Comparative Example of Embodiment

Figure 7:
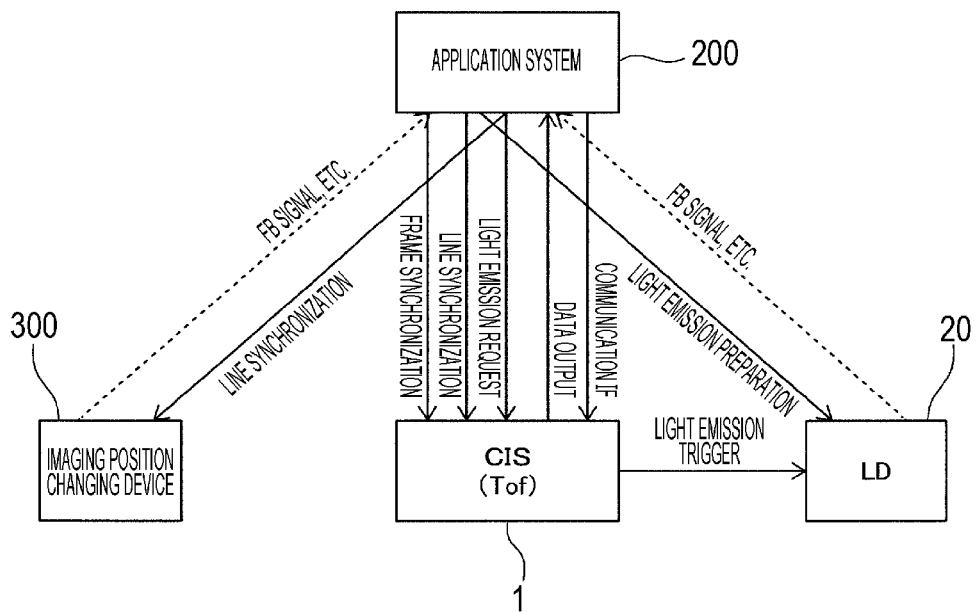
FIG. 7 is a block diagram illustrating a sensor control system as a comparative example.

FIG. 7 is a block diagram illustrating a sensor control system as a comparative example. Note that, in FIG. 7, the same portions as those in FIG. 4 described above will be denoted by the same reference signs, and the detailed description thereof will be omitted.

In the comparative example, the application system 200 not only transmits a synchronization signal to the distance measurement sensor 1 but also transmits a synchronization signal to the imaging position changing device 300. Furthermore, the application system 200 not only receives distance measurement data from the distance measurement sensor 1 but also receives feedback signals from the light emitting unit 20 and the imaging position changing device 300.

Therefore, the synchronization signals generated and managed by the application system 200 increase. Furthermore, when the same synchronization signal is output to two devices including the distance measurement sensor 1 and a device other than the distance measurement sensor 1, the number of wirings to be cared is doubled.

Solution of First Embodiment

Therefore, in the first embodiment, the distance measurement sensor 1 executes the transmission of the light emission trigger to the light emitting unit 20, the reception of the feedback signal for the light emission trigger, the transmission of the line synchronization signal to the imaging position changing device 300, and the reception of the feedback signal for the line synchronization signal as illustrated in FIG. 4.

Operational Effect of First Embodiment

As described above, according to the first embodiment, the application system 200 is connected to and communicates with the distance measurement sensor 1 only when transmitting the communication interface signal, transmitting a frame synchronization signal, and receiving the distance measurement data including the error determination result from the distance measurement sensor 1, and the distance measurement sensor 1 executes the transmission of the light emission trigger with respect to the light emitting unit 20, the reception of the feedback signal in response to the light emission trigger, the transmission of the line synchronization signal with respect to the imaging position changing device 300, and the reception of the feedback signal in response to the line synchronization signal, so that the processing amount of the application system 200 is mitigated. Moreover, the number of target signals to be cared for noise can be reduced, and efficient synchronization control can be performed in real time.

Furthermore, according to the first embodiment, the application system 200 only needs to transmit the frame synchronization signal to the distance measurement sensor 1, and the distance measurement sensor 1 generates the line synchronization signal having the cycle shorter than that of the frame synchronization signal and transmits the line synchronization signal to the imaging position changing device 300, so that the efficient synchronization control can be performed.

Moreover, since the error determination on the synchronization signal is performed by the distance measurement sensor 1 according to the first embodiment, it is unnecessary for the application system 200 to perform error determination on the synchronization signal, and the processing amount of the application system 200 can be reduced accordingly.

Second Embodiment

Next, a second embodiment will be described. The second embodiment is a modification of the first embodiment.

Figure 8:
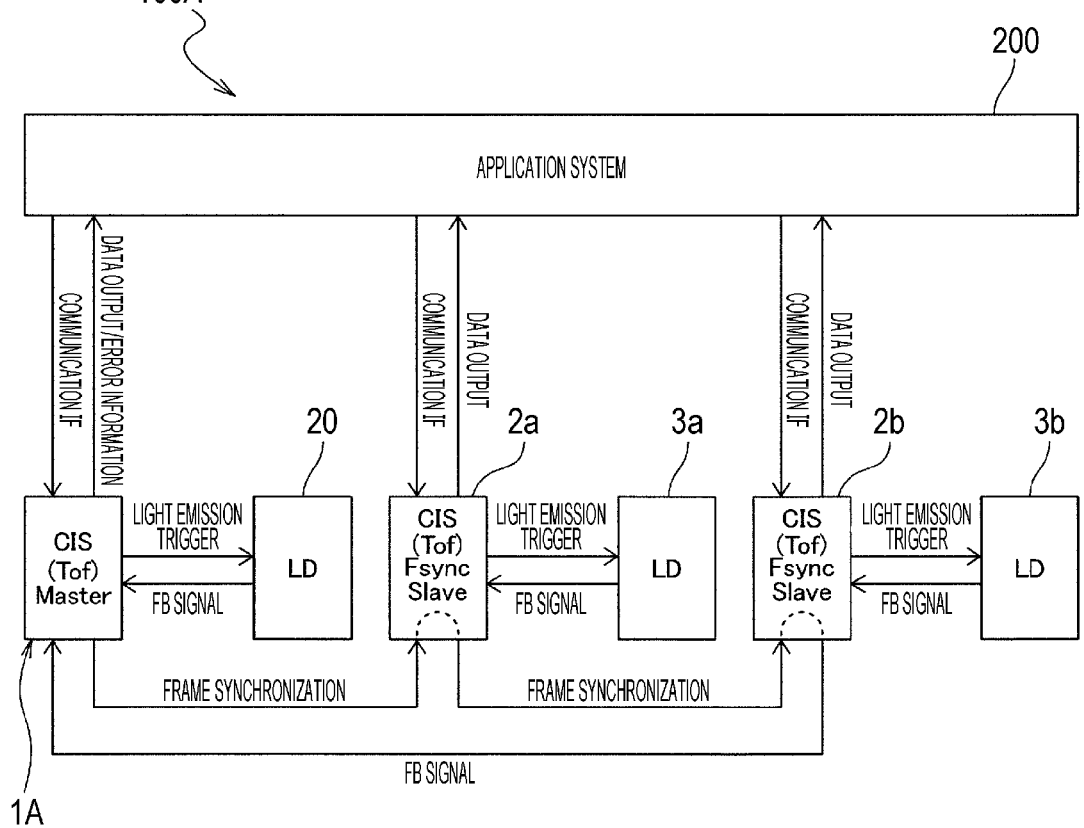
FIG. 8 is a block configuration diagram illustrating a sensor control system according to a second embodiment.

FIG. 8 is a block configuration diagram illustrating a sensor control system 100A according to the second embodiment. In FIG. 8, the same portions as those in FIG. 4 described above will be denoted by the same reference signs, and the detailed description thereof will be omitted.

A distance measurement sensor 1A operating as a master and distance measurement sensors 2a and 2b operating as slaves are connected to the application system 200. When receiving a communication interface signal from the application system 200, the distance measurement sensor 1A generates a frame synchronization signal on the basis of the communication interface signal, controls the distance measurement processing unit 50 on the basis of the frame synchronization signal, transmits a light emission trigger to the light emitting unit 20, and transmits the frame synchronization signal to the distance measurement sensor 2a as the slave.

The distance measurement sensor 2a controls a distance measurement processing unit on the basis of the received frame synchronization signal and transmits a light emission trigger to a light emitting unit 3a, and transmits the frame synchronization signal to the distance measurement sensor 2b in the subsequent stage in a case where the distance measurement sensor 2b exists in the subsequent stage.

The distance measurement sensor 2b controls a distance measurement processing unit on the basis of the received frame synchronization signal, transmits a light emission trigger to a light emitting unit 3b, and transmits a feedback signal to the distance measurement sensor 1A as the master in a case where there is no distance measurement sensor in the subsequent stage.

When receiving the feedback signal, the distance measurement sensor 1A performs error determination as to whether or not the feedback signal has been returned within a predetermined time since the initiation of the frame synchronization signal, and transmits an error determination result in the state of being included in distance measurement data to the application system 200.

Operational Effect of Second Embodiment

As described above, according to the above-described second embodiment, operational effects similar to those of the first embodiment described above can be obtained, and the distance measurement sensor 1A serves as the master and passes the frame synchronization signal to the plurality of distance measurement sensors 2a and 2b in a row so that the distance measurement sensors 1A, 2a, and 2b can be synchronized with each other. Since the distance measurement sensor 1A only needs to perform the error determination by receiving the feedback signal from the distance measurement sensor 2b that receives the frame synchronization signal last, it is possible to perform flexible synchronization control suitable for a system. Furthermore, flexible system design is possible even if there is a distance measurement sensor 2a that is partially synchronized with the distance measurement sensor 1A and does not require synchronization.

Furthermore, according to the second embodiment described above, the application system 200 only needs to transmit the communication interface signal to each of the distance measurement sensors 1A, 2a, and 2b, and thus, it is possible to easily cope with an increase in the number of distance measurement sensors.

Third Embodiment

Next, a third embodiment will be described. The third embodiment is a modification of the second embodiment.

Figure 9:
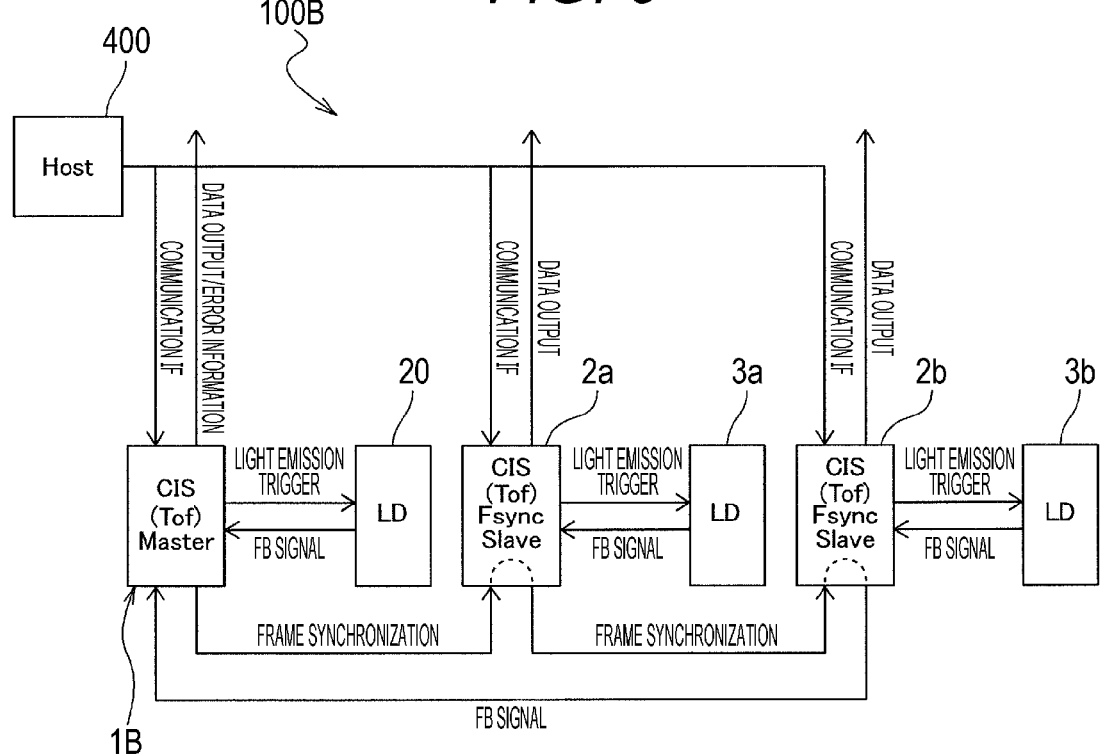
FIG. 9 is a block configuration diagram illustrating a sensor control system according to a third embodiment.

FIG. 9 is a block configuration diagram illustrating a sensor control system 100B according to the third embodiment. In FIG. 9, the same portions as those in FIG. 8 described above will be denoted by the same reference signs, and the detailed description thereof will be omitted.

In the sensor control system 100B, instead of the application system 200, a host device 400 transmits a communication interface signal to each of a distance measurement sensor 1B and the distance measurement sensors 2a, and 2b.

When receiving a feedback signal, the distance measurement sensor 1B performs error determination as to whether or not the feedback signal has been returned within a predetermined time since the initiation of a frame synchronization signal, and transmits an error determination result in the state of being included in distance measurement data to the application system 200.

Operational Effect of Third Embodiment

As described above, according to the third embodiment, effects similar to those of the second embodiment described above can be obtained, and the application system 200 only needs to receive the distance measurement data from each of the distance measurement sensors 1B, 2a, and 2b, so that a processing load is reduced accordingly.

Fourth Embodiment

Next, a fourth embodiment will be described. The fourth embodiment is a modification of the second embodiment.

Figure 10:
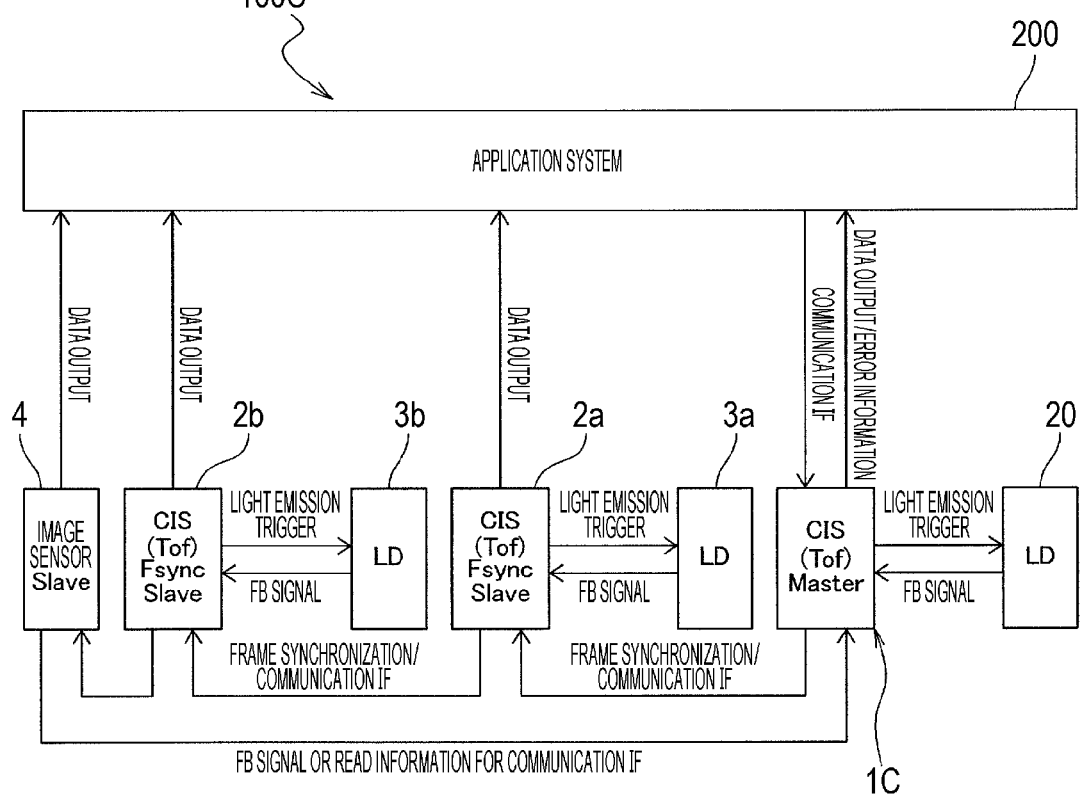
FIG. 10 is a block configuration diagram illustrating a sensor control system according to a fourth embodiment.

FIG. 10 is a block configuration diagram illustrating a sensor control system 100C according to the fourth embodiment. In FIG. 10, the same portions as those in FIG. 8 described above will be denoted by the same reference signs, and the detailed description thereof will be omitted.

A distance measurement sensor 1C functioning as a master, the distance measurement sensors 2a and 2b operating as slaves, and an image sensor 4 are connected to the application system 200. When receiving a communication interface signal from the application system 200, the distance measurement sensor 1C generates a frame synchronization signal on the basis of the communication interface signal, controls the distance measurement processing unit 50 on the basis of the frame synchronization signal, transmits a light emission trigger to the light emitting unit 20, and transmits the frame synchronization signal and the communication interface signal to the distance measurement sensor 2a as the slave.

The distance measurement sensor 2a controls a distance measurement processing unit on the basis of the received frame synchronization signal, transmits a light emission trigger to the light emitting unit 3a, and transmits distance measurement data to the application system 200 on the basis of the received communication interface signal. Furthermore, in a case where the distance measurement sensor 2b exists in the subsequent stage, the distance measurement sensor 2a transmits the frame synchronization signal and the communication interface signal to the distance measurement sensor 2b in the subsequent stage.

The distance measurement sensor 2b controls a distance measurement processing unit on the basis of the received frame synchronization signal, transmits a light emission trigger to the light emitting unit 3b, and transmits distance measurement data to the application system 200 on the basis of the received communication interface signal. Furthermore, in a case where the image sensor 4 exists in the subsequent stage, the distance measurement sensor 2b transmits the frame synchronization signal and the communication interface signal to the image sensor 4 in the subsequent stage.

The image sensor 4 generates and accumulates a charge according to the amount of light received from a predetermined imaging field of view, and generates an image signal of an imaging field of view of, for example, 30 frames per second according to the amount of the accumulated charge. The image sensor 4 controls an image processing unit on the basis of the received frame synchronization signal, and transmits the image signal to the application system 200 on the basis of the received communication interface signal. Furthermore, in a case where there is no slave in the subsequent stage, the image sensor 4 transmits a feedback signal or read information in response to the communication interface signal to the distance measurement sensor 1C as the master.

When receiving the feedback signal or the read information in response to the communication interface signal, the distance measurement sensor 1C performs error determination as to whether or not the feedback signal has been returned within a predetermined time since the initiation of the frame synchronization signal, and transmits an error determination result in the state of being included in distance measurement data to the application system 200.

Operational Effect of Fourth Embodiment

As described above, according to the above-described fourth embodiment, operational effects similar to those of the second embodiment described above can be obtained, and, even if the image sensor 4 that has no mechanism for transmitting a feedback signal in response to the frame synchronization signal is included, the distance measurement sensor 1C as the master can read a count number of frames of the image sensor 4 and use the read count number as the feedback signal for the frame synchronization signal, and flexible system design is possible.

Fifth Embodiment

Next, a fifth embodiment will be described. The fifth embodiment is a modification of the fourth embodiment.

Figure 11:
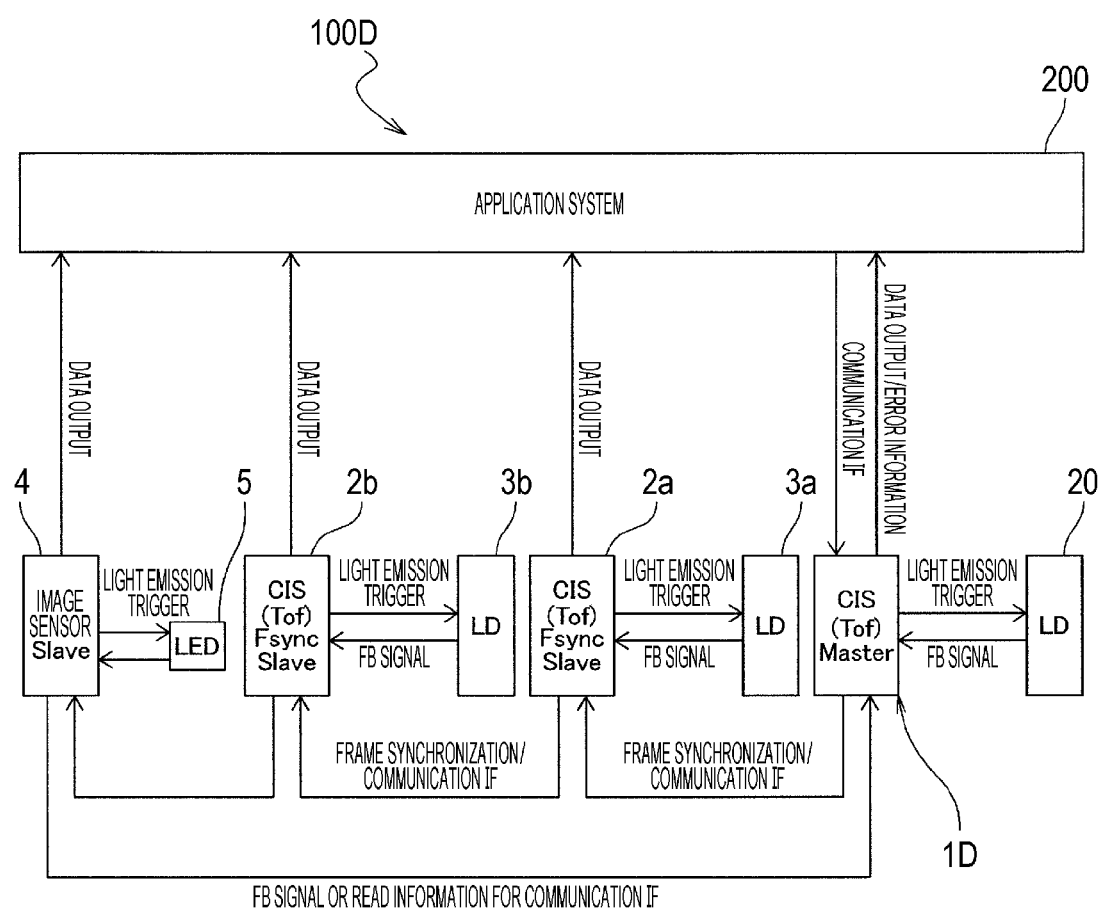
FIG. 11 is a block configuration diagram illustrating a sensor control system according to a fifth embodiment.

FIG. 11 is a block configuration diagram illustrating a sensor control system 100D according to the fifth embodiment. In FIG. 11, the same portions as those in FIG. 10 described above will be denoted by the same reference signs, and the detailed description thereof will be omitted.

The light emitting unit 5 that emits IR light is connected to the image sensor 4.

When receiving a communication interface signal from the application system 200, a distance measurement sensor 1D generates a frame synchronization signal on the basis of the communication interface signal, controls the distance measurement processing unit 50 on the basis of the frame synchronization signal, transmits a light emission trigger to the light emitting unit 20, and transmits the frame synchronization signal and the communication interface signal to the distance measurement sensor 2a as a slave.

The distance measurement sensor 2a controls a distance measurement processing unit on the basis of the received frame synchronization signal, transmits a light emission trigger to the light emitting unit 3a, and transmits distance measurement data to the application system 200 on the basis of the received communication interface signal. Furthermore, in a case where the distance measurement sensor 2b exists in the subsequent stage, the distance measurement sensor 2a transmits the frame synchronization signal and the communication interface signal to the distance measurement sensor 2b in the subsequent stage.

The distance measurement sensor 2b controls a distance measurement processing unit on the basis of the received frame synchronization signal, transmits a light emission trigger to the light emitting unit 3b, and transmits distance measurement data to the application system 200 on the basis of the received communication interface signal. Furthermore, in a case where the image sensor 4 exists in the subsequent stage, the distance measurement sensor 2b transmits the frame synchronization signal and the communication interface signal to the image sensor 4 in the subsequent stage.

The image sensor 4 controls an image processing unit on the basis of the received frame synchronization signal, transmits a light emission trigger to the light emitting unit 5, and transmits an image signal to the application system 200 on the basis of the received communication interface signal. Furthermore, in a case where there is no slave in the subsequent stage, the image sensor 4 transmits a feedback signal or read information in response to the communication interface signal to the distance measurement sensor 1D as a master.

When receiving the feedback signal or the read information in response to the communication interface signal, the distance measurement sensor 1D performs error determination as to whether or not the feedback signal has been returned within a predetermined time since the initiation of the frame synchronization signal, and transmits an error determination result in the state of being included in distance measurement data to the application system 200.

Operational Effect of Fifth Embodiment

As described above, according to the above-described fifth embodiment, operational effects similar to those of the fourth embodiment described above can be obtained, and exclusive control between sensors is facilitated.

Sixth Embodiment

Next, a sixth embodiment will be described. The sixth embodiment is a modification of the second embodiment.

Figure 12:
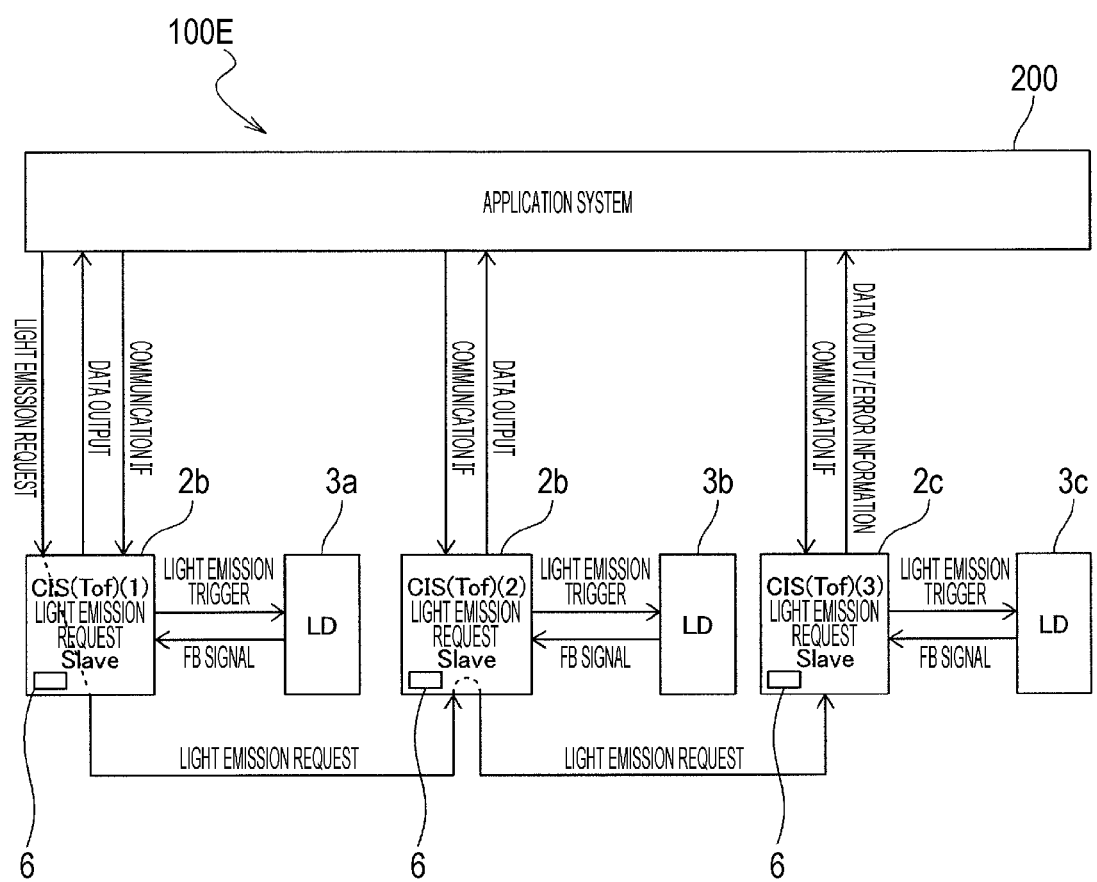
FIG. 12 is a block configuration diagram illustrating a sensor control system according to a sixth embodiment.

FIG. 12 is a block configuration diagram illustrating a sensor control system 100E according to the sixth embodiment. In FIG. 12, the same portions as those in FIG. 8 described above will be denoted by the same reference signs, and the detailed description thereof will be omitted.

The distance measurement sensors 2a and 2b, and a distance measurement sensor 2c operating as slaves are connected to the application system 200. Each of the distance measurement sensors 2a, 2b, and 2c includes a light emission request transmission unit 6 that transmits a light emission trigger to each of the light emitting units 3a and 3b, and a light emitting unit 3c on the basis of a received light emission request when receiving the light emission request from the application system 200, and transmits the light emission request to the last distance measurement sensor in a connection order sequentially via the distance measurement sensors.

Figure 13A:
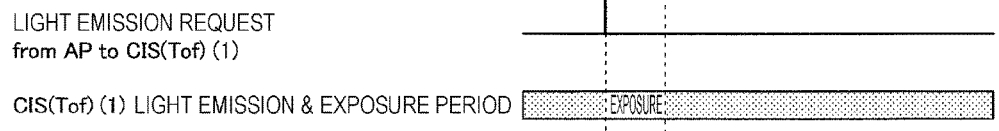
FIGS. 13A, 13B, and 13C are timing charts illustrating a light emission operation of each distance measurement sensor according to the sixth embodiment.

When receiving a light emission request illustrated in FIG. 13A from the application system 200, the distance measurement sensor 2a transmits a light emission trigger to the light emitting unit 3a to cause light emission, and transmits the light emission request to the distance measurement sensor 2b as the slave.

Figure 13B:
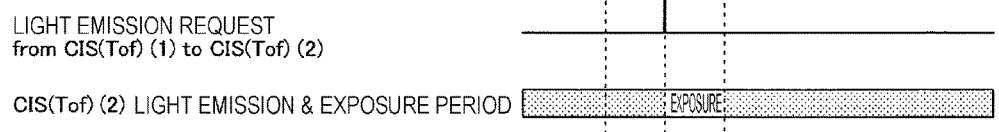

On the basis of the received light emission request illustrated in FIG. 13B, the distance measurement sensor 2b transmits a light emission trigger to the light emitting unit 3b to cause light emission at a timing shifted from that of the light emitting unit 3a, and transmits a light emission request to the distance measurement sensor 2c in the subsequent stage in a case where the distance measurement sensor 2c exists in the subsequent stage.

Figure 13C:
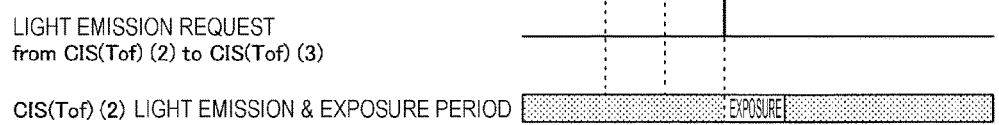

On the basis of the received light emission request illustrated in FIG. 13C, the distance measurement sensor 2c transmits a light emission trigger to the light emitting unit 3c to cause light emission at a timing shifted from that of the light emitting unit 3b, and notifies the application system 200 of an error or the like in a case where there is no slave in the subsequent stage.

Operational Effect of Sixth Embodiment

As described above, according to the sixth embodiment described above, frame rates and light emission patterns are different when the plurality of distance measurement sensors 2a, 2b, and 2c is sensors of different types, and thus, light emission control is performed by the application system 200, and the light emission timings can be shifted to prevent interference by using a delay amount of each of the distance measurement sensors 2a, 2b, and 2c.

Seventh Embodiment

Next, a seventh embodiment will be described. The seventh embodiment is a modification of the second embodiment.

Figure 14:
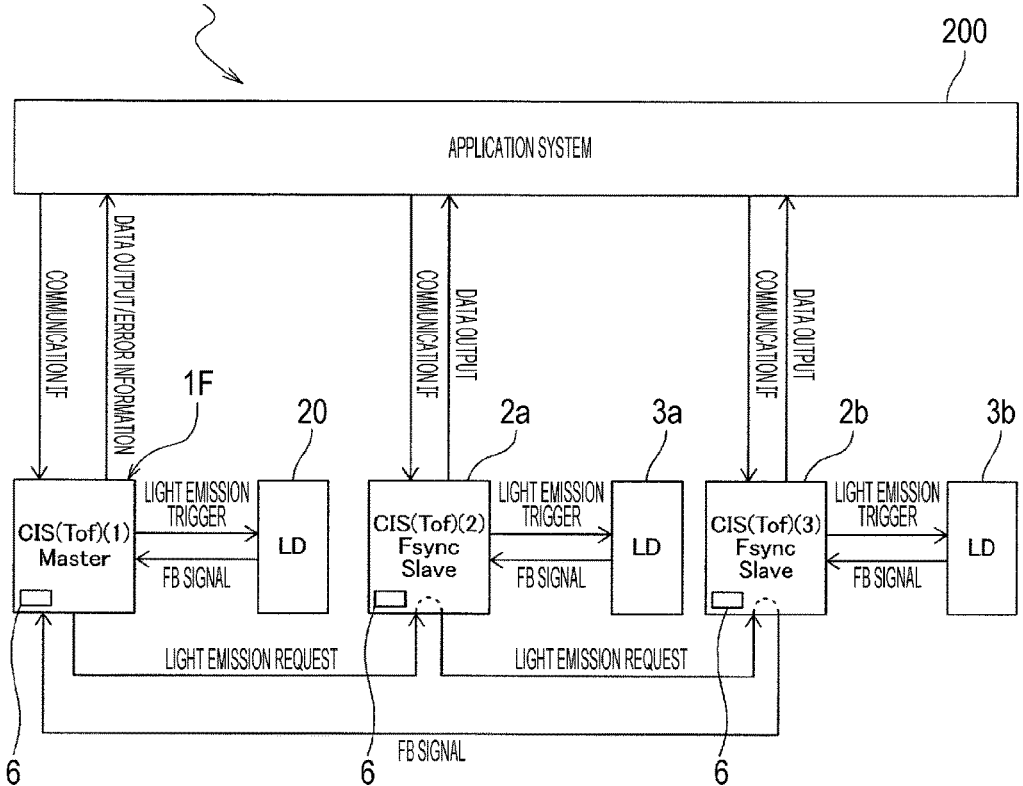
FIG. 14 is a block configuration diagram illustrating a sensor control system according to a seventh embodiment.

FIG. 14 is a block configuration diagram illustrating a sensor control system 100E according to the seventh embodiment. In FIG. 12, the same portions as those in FIG. 12 described above will be denoted by the same reference signs, and the detailed description thereof will be omitted.

A distance measurement sensor 1F functioning as a master includes the light emission request transmission unit 6 described above. The distance measurement sensor 1F transmits a light emission trigger to the light emitting unit 20 to cause light emission, and transmits a light emission request to the distance measurement sensor 2a as a slave.

On the basis of the received light emission request illustrated in FIG. 15B, the distance measurement sensor 2a transmits a light emission trigger to the light emitting unit 3a to cause light emission at a timing shifted from that of the light emitting unit 20, and transmits a light emission request to the distance measurement sensor 2b in the subsequent stage in a case where the distance measurement sensor 2b exists in the subsequent stage.

On the basis of the received light emission request illustrated in FIG. 15B, the distance measurement sensor 2b transmits a light emission trigger to the light emitting unit 3b to cause light emission at a timing shifted from that of the light emitting unit 3a, and transmits a feedback signal to the distance measurement sensor 1F as the master in a case where there is no distance measurement sensor in the subsequent stage.

When receiving the feedback signal the distance measurement sensor 1F performs error determination as to whether or not the feedback signal has been returned within a predetermined time since the transmission of the light emission request, and transmits an error determination result in the state of being included in distance measurement data to the application system 200 as illustrated in FIG. 15C. Note that the distance measurement sensor 1F measures a time required from the transmission of the light emission request to the distance measurement sensor 2a to the reception of the feedback signal in response to the light emission request, and transmits error information to the application system 200 in a case where the feedback signal is not received within a predetermined time.

Operational Effect of Seventh Embodiment

As described above, according to the above-described seventh embodiment, the distance measurement sensor 1F serving as the master can notify the application system 200 of the error if the feedback signal is not returned within a range in which an exposure time, a wiring delay, and the like are taken into consideration.

Furthermore, according to the seventh embodiment described above, it is possible to measure the time required from the transmission of the light emission request by the distance measurement sensor 1F serving as the master to the reception of the feedback signal in response to the light emission request.

Eighth Embodiment

Next, an eighth embodiment will be described. The eighth embodiment is an embodiment in which error detection of a feedback signal in response to a synchronization signal is performed.

FIGS. 16A, 16B, 17A, and 17B are timing charts at the time of receiving a feedback signal and performing error determination as a master as the eighth embodiment.

Figure 16A:
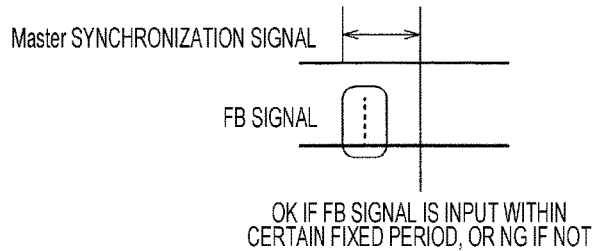
FIGS. 16A and 16B are timing charts illustrating an example of performing error determination in a case where a frame synchronization signal is sufficiently free as an eighth embodiment.
Figure 16B:
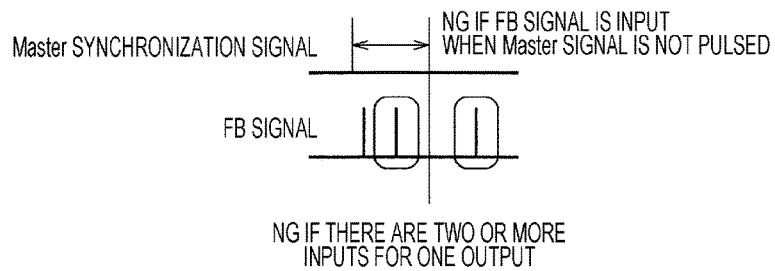

FIGS. 16A and 16B are examples in which error determination is performed in a case where a frame synchronization signal is sufficiently free.

As illustrated in FIG. 16A, the error determination unit 85 of the distance measurement sensor 1 determines that it is OK if a feedback signal is received within a certain fixed time after a frame synchronization signal generated by the master synchronization signal generation unit 81 is transmitted to a slave, and determines that an error has occurred if not.

Furthermore, the error determination unit 85 determines that an error has occurred if the feedback signal is received twice or more as illustrated in FIG. 16B after the frame synchronization signal generated by the master synchronization signal generation unit 81 is transmitted to the slave. Moreover, it is determined as an error if the feedback signal is received when the frame synchronization signal is not pulsed.

Figure 17A:
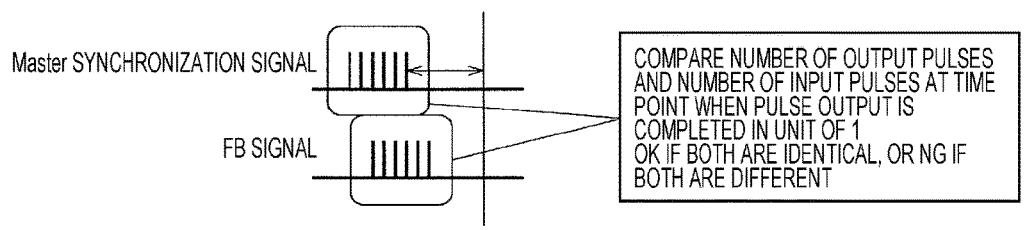
FIGS. 17A and 17B are timing charts illustrating an example of performing error determination in a case where overtaking is likely to occur if delay processing is performed due to pulses output in a short period.
Figure 17B:
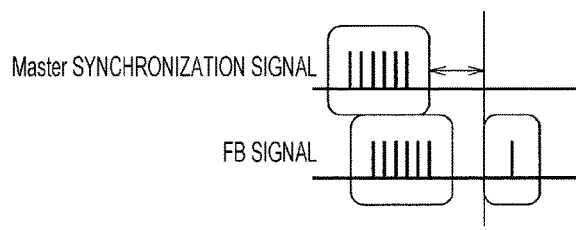

FIGS. 17A and 17B are examples of performing error determination in a case where overtaking is likely to occur if delay processing is performed due to pulses output in a short period.

As illustrated in FIG. 17A, the error determination unit 85 compares the number of pulses of the frame synchronization signal with the number of pulses of the feedback signal at a time point when pulse output is completed in a unit of 1, and determines that it is OK if the both are identical and determines that an error has occurred if the both are different. Furthermore, as illustrated in FIG. 17B, it is determined as an error if the feedback signal is received when the frame synchronization signal is not pulsed.

Figure 18:
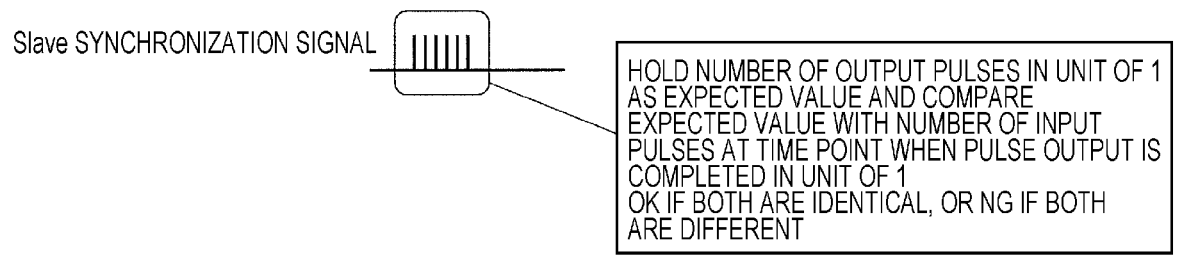
FIG. 18 is a timing chart illustrating an example of performing error determination as a slave.

FIG. 18 is an example of performing error determination as a slave.

The error determination unit 85 holds the number of output pulses in a unit of 1 as an expected value, compares the expected value with the number of input pulses at a time point when pulse output is completed in the unit of 1, and determines that it is OK if the both are identical and determines that an error has occurred if the both are different.

Ninth Embodiment

Next, a ninth embodiment will be described. The ninth embodiment is an embodiment of I2C/SPI communication.

Figure 19:
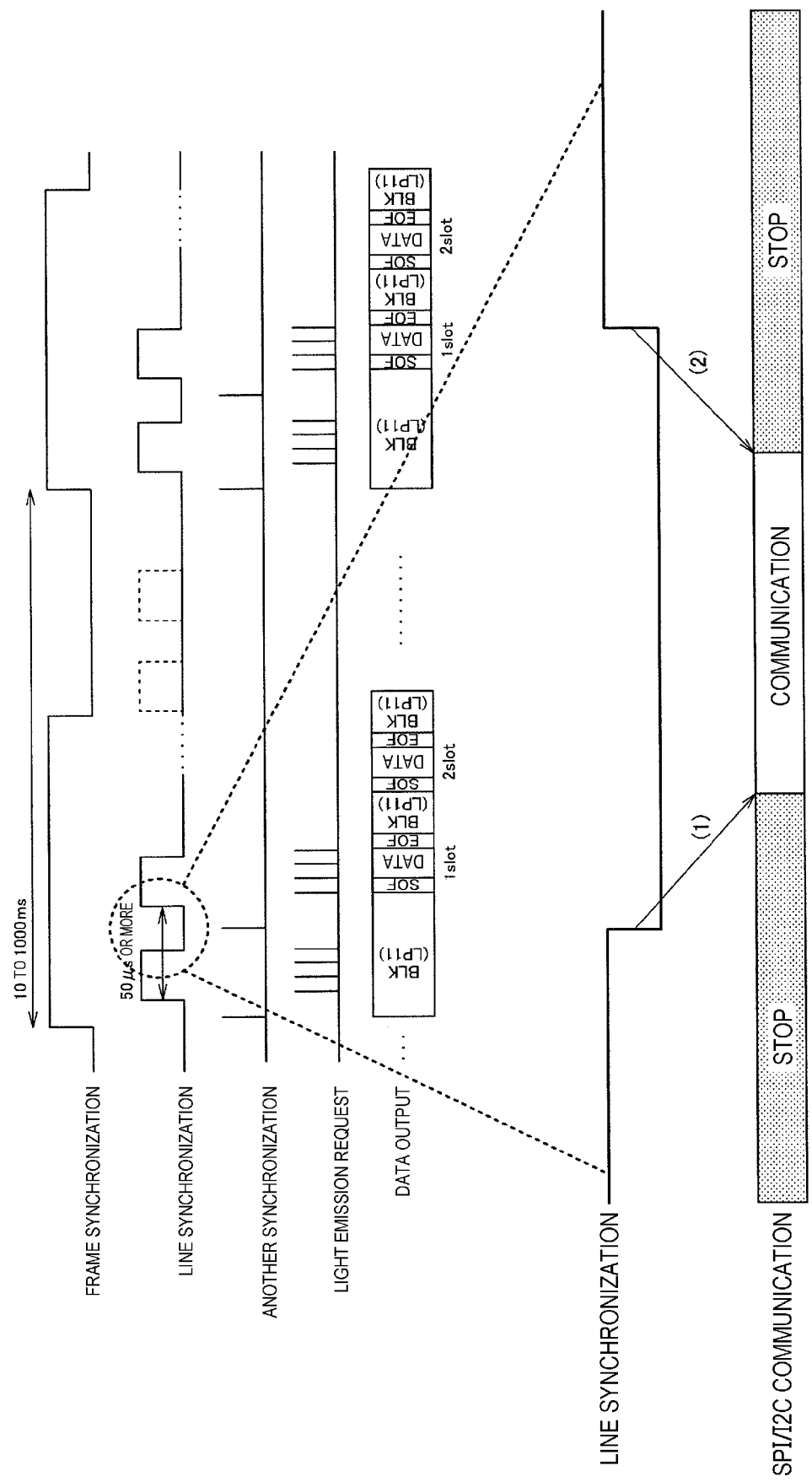
FIG. 19 is a timing chart illustrating an I2C/SPI communication operation according to a ninth embodiment.

FIG. 19 is a timing chart illustrating an I2C/SPI communication operation according to the ninth embodiment.

Since the distance measurement sensor 1 grasps a timing of a synchronization signal, it is possible to perform I2C/SPI communication control according to the synchronization signal.

Furthermore, in a case where internal adjustment is performed at the time of operating as a master or a slave, communication can be performed earlier than the synchronization signal.

In a case where it is desired to perform communication before the start of a line synchronization operation, communication is enabled at the end of the previous line operation ((1) in FIG. 19) or at the time of FIG. 19 (2) retroactively from the next synchronization.

With this configuration, it is possible to efficiently control a peripheral device before a sensor operation or during a blanking period or the like after the sensor operation.

Other Embodiments

Although the present technology has been described according to the first to ninth embodiments as described above, the descriptions and drawings constituting a part of this disclosure should not be construed to limit the present technology. It may be apparent to those skilled in the art that the present technology can encompass various alternative embodiments, examples, and operational techniques when understanding the gist of the technical contents disclosed by the embodiments described above. Furthermore, the configurations disclosed in the first to ninth embodiments and modified examples of the first to ninth embodiments can be appropriately combined within a range in which no contradiction occurs. For example, configurations disclosed by a plurality of different embodiments may be combined, or configurations disclosed by a plurality of different modified examples of the same embodiment may be combined.

Note that the present disclosure can also have the following configurations.

(1)

A sensor control system including:

a light emitting unit that irradiates a target area with light;

a sensor including a plurality of pixels each of which receives reflected light from the target area and converts the reflected light into an electric signal, and a signal processing unit that performs signal processing on the basis of the electric signal output from each of the pixels; and a control device that is connectable to the sensor and controls execution of the signal processing of the sensor, in which the sensor includes a communication interface processing unit that receives a communication interface signal necessary for control related to the signal processing from an external device, a synchronization signal generation unit that generates a synchronization signal for synchronization with the signal processing on the basis of the communication interface signal, a light emission trigger output unit that transmits a light emission trigger for irradiation of the light emitting unit with light on the basis of the synchronization signal, a synchronization signal processing unit that controls the signal processing unit on the basis of the synchronization signal and transmits the synchronization signal to a connectable external device, and a feedback signal processing unit that receives a feedback signal returned from the light emitting unit in response to the light emission trigger, receives a feedback signal returned from the external device in response to the synchronization signal, and transmits predetermined signal processing data including a reception result to the control device.

(2)
The sensor control system according to (1), in which
the synchronization signal generation unit generates a frame synchronization signal synchronized with an imaging frame formed by the plurality of pixels, and
the synchronization signal processing unit generates a line synchronization signal having a cycle shorter than a cycle of the frame synchronization signal from the frame synchronization signal and transmits the line synchronization signal to the external device.

(3)
The sensor control system according to (2), in which
the synchronization signal processing unit transmits the line synchronization signal to an imaging position changing device capable of changing an imaging position of the sensor.

(4)
The sensor control system according to (1), in which
the feedback signal processing unit performs error determination by comparing the synchronization signal and the feedback signal, and transmits an error determination result to the control device.

(5)
The sensor control system according to (2), in which
a plurality of the sensors is provided,
the synchronization signal processing unit controls the signal processing unit in a first sensor among the plurality of the sensors on the basis of the frame synchronization signal and outputs the frame synchronization signal to another second sensor, controls the signal processing unit in the second sensor on the basis of the frame synchronization signal and outputs the frame synchronization signal to a second sensor in a subsequent stage in a case where the second sensor in the subsequent stage exists, and
in the first sensor, the feedback signal processing unit receives a feedback signal transmitted from a second sensor in a final stage and transmits a reception result to the control device.

(6)
The sensor control system according to (5), in which
the communication interface processing unit receives the communication interface signal from the control device in each of the plurality of the sensors.

(7)
The sensor control system according to (5), in which
the communication interface processing unit receives the communication interface signal from the control device in the first sensor, and transmits the communication interface signal from the first sensor to a second sensor, which is last in a connection order, via a plurality of the second sensors sequentially.

(8)
The sensor control system according to (5), in which
the second sensor which is last in the connection order is an image sensor.

(9)
The sensor control system according to (5), in which
each of the plurality of sensors includes a light emission request transmission unit that transmits the light emission trigger to the light emitting unit, when receiving a light emission request from the control device, on the basis of the received light emission request, and transmits the light emission request to a sensor which is last in a connection order via the plurality of sensors sequentially.

(10)
The sensor control system according to (9), in which
in the first sensor, the feedback signal processing unit receives the feedback signal for transmission of the light emission request from the second sensor in the final stage, and transmits the predetermined signal processing data including the reception result to the control device.

(11)
The sensor control system according to (5), in which
in the first sensor, the feedback signal processing unit performs error determination by comparing the frame synchronization signal and the feedback signal output from the second sensor in the final stage, and transmits a result of the error determination to the control device.

(12)
The sensor control system according to (10), in which
the feedback signal processing unit measures a time required from transmission of the light emission request to the second sensor to reception of the feedback signal for the light emission request in the first sensor, and transmits error information to the control device in a case where the feedback signal is not received within a predetermined time.

(13)
The sensor control system according to (1), in which
the synchronization signal generation unit receives the synchronization signal from the control device.

(14)
The sensor control system according to (1), in which
the communication interface processing unit receives a communication interface signal from the control device.

(15)
A sensor including:
a plurality of pixels each of which receives reflected light from a target area and converts the reflected light into an electric signal, the target area being irradiated with light by a light emitting unit;
a signal processing unit that performs signal processing on the basis of the electric signal output from each of the pixels;
a communication interface processing unit that receives a communication interface signal necessary for control related to the signal processing from an external device;
a synchronization signal generation unit that receives a synchronization signal for synchronization with the signal processing on the basis of the communication interface signal;
a light emission trigger output unit that transmits a light emission trigger for irradiation of the light emitting unit with light on the basis of the synchronization signal;
a synchronization signal processing unit that controls the signal processing unit on the basis of the synchronization signal and transmits the synchronization signal to a connectable external device; and
a feedback signal processing unit that receives a feedback signal returned from the light emitting unit in response to the light emission trigger, receives a feedback signal returned from the external device in response to the synchronization signal, and transmits a reception result in a state of being included in predetermined signal processing data to a control device that controls execution of the signal processing.

(16)

A sensor including:
a plurality of pixels each of which receives reflected light from a target area and converts the reflected light into an electric signal, the target area being irradiated with light by a light emitting unit;
a signal processing unit that performs signal processing on the basis of the electric signal output for each of the pixels;
a communication interface processing unit that receives a communication interface signal necessary for control related to the signal processing;
a synchronization signal reception unit that receives a synchronization signal for synchronization with the signal processing from an external device;
a light emission trigger output unit that transmits a light emission trigger for irradiation of the light emitting unit with light on the basis of the synchronization signal; and
a synchronization signal processing unit that controls the signal processing unit on the basis of the synchronization signal and transmits the synchronization signal to a connectable external device.

(17)

The sensor according to (16), further including a feedback signal processing unit that receives a feedback signal returned from the light emitting unit in response to the light emission trigger, and transmits a reception result in a state of being included in a feedback signal sent to an external device.

(18)

The sensor according to (16), in which the communication interface processing unit receives the communication interface signal from a control device that controls execution of the signal processing.

(19)

The sensor according to (16), in which the communication interface processing unit receives the communication interface signal from an external device.

REFERENCE SIGNS LIST 1, 1A, 1B, 1C, 1D, 1F, 2a, 2b, 2c Distance measurement sensor
3a, 3b, 3c, 5, 20 Light emitting unit
4 Image sensor
6 Light emission request transmission unit
10 System control unit
10a Communication interface signal processing unit
10b Frame synchronization signal reception unit
10c Frame synchronization signal processing unit
30 Light emission timing adjustment unit
40 Light receiving unit
41 Pixel
43 Pixel drive line
44 Vertical signal line
50 Distance measurement processing unit
51 Sampling circuit
52 Histogram generation circuit
53 Distance calculation circuit
60 Communication interface unit
70 Pixel drive unit
81 Master synchronization signal generation unit
82 Slave signal reception unit
83 Synchronization signal selection unit
84 Delay adjustment unit
85 Error determination unit
90 Buffer
100, 100A, 100B, 100C, 100D, 100E Sensor control system
200 Application system
300 Imaging position changing device
400 Host device

The invention claimed is:

1. A sensor control system comprising:
a light emitting circuit configured to irradiate a target area with light;
a sensor including a plurality of pixels and a signal processing circuit, wherein each of the plurality of pixels is configured to: receive reflected light from the target area; and convert the reflected light into an electric signal, and the signal processing circuit is configured to perform signal processing based on the electric signal output from each of the plurality of pixels; and
a control device configured to control an execution of the signal processing of the sensor,
wherein the control device is connectable to the sensor, and the sensor includes
a communication interface processing circuit configured to receive a communication interface signal necessary for control related to the signal processing from an external device;
a synchronization signal generation circuit configured to generate a synchronization signal for synchronization with the signal processing based on the communication interface signal,
a light emission trigger output circuit configured to transmit a light emission trigger for irradiation of the light emitting circuit with light based on the synchronization signal;
a synchronization signal processing circuit that controls the signal processing circuit on a basis of the synchronization signal; and transmit the synchronization signal to a connectable external device; and
a feedback signal processing circuit configured to receive a feedback signal returned from the light emitting circuit in response to the light emission trigger; receive a feedback signal returned from the external device in response to the synchronization signal; and transmit predetermined signal processing data including a reception result to the control device.

2. The sensor control system according to claim 1, wherein
the synchronization signal generation circuit is further configured to generate a frame synchronization signal synchronized with an imaging frame formed by the plurality of pixels, and
the synchronization signal processing circuit is further configured to: generate a line synchronization signal having a cycle shorter than a cycle of the frame synchronization signal from the frame synchronization signal; and transmit the line synchronization signal to the external device.

3. The sensor control system according to claim 2, wherein the synchronization signal processing circuit is further configured to transmit the line synchronization signal to an imaging position changing device capable of changing an imaging position of the sensor.

4. The sensor control system according to claim 2, wherein
a plurality of the sensors is provided,
the synchronization signal processing circuit is further configured to: control the signal processing circuit in a first sensor among the plurality of the sensors based on the frame synchronization signal; and output the frame synchronization signal to a second sensor, controls the signal processing circuit in the second sensor based on the frame synchronization signal; and output the frame synchronization signal to a second sensor in a subsequent stage based on the second sensor in the subsequent stage exists, and in the first sensor, the feedback signal processing circuit is further configured to receive a feedback signal transmitted from a second sensor in a final stage and transmits a reception result to the control device.

5. The sensor control system according to claim 4, wherein the communication interface processing circuit is further configured to receive the communication interface signal from the control device in each of the plurality of the sensors.

6. The sensor control system according to claim 4, wherein
the communication interface processing circuit is further configured to: receive the communication interface signal from the control device in the first sensor; and transmit the communication interface signal from the first sensor to a second sensor, which is last in a connection order, via a plurality of the second sensors sequentially.

7. The sensor control system according to claim 4, wherein
the second sensor which is last in the connection order is an image sensor.

8. The sensor control system according to claim 4, wherein
each of the plurality of sensors includes a light emission request transmission circuit that is further configured to: transmit the light emission trigger to the light emitting circuit, when receiving a light emission request from the control device, based on the received light emission request; and transmit the light emission request to a sensor which is last in a connection order via the plurality of sensors sequentially.

9. The sensor control system according to claim 8, wherein
in the first sensor, the feedback signal processing circuit is further configured to: receive the feedback signal for transmission of the light emission request from the second sensor in the final stage; and transmit the predetermined signal processing data including the reception result to the control device.

10. The sensor control system according to claim 9, wherein
the feedback signal processing circuit is further configured to: measure a time required from transmission of the light emission request to the second sensor to reception of the feedback signal for the light emission request in the first sensor; and transmit error information to the control device based on the feedback signal is not received within a predetermined time.

11. The sensor control system according to claim 4, wherein
in the first sensor, the feedback signal processing circuit is further configured to: perform error determination by comparing the frame synchronization signal and the feedback signal output from the second sensor in the final stage; and transmit a result of the error determination to the control device.

12. The sensor control system according to claim 1, wherein the feedback signal processing circuit performs error determination by comparing the synchronization signal and the feedback signal, and transmits an error determination result to the control device.

13. The sensor control system according to claim 1, wherein the synchronization signal generation circuit is further configured to receive the synchronization signal from the control device.

14. The sensor control system according to claim 1, wherein the communication interface processing circuit is further configured to receive a communication interface signal from the control device.

15. A sensor comprising:
a plurality of pixels each of configured to receive reflected light from a target area; and convert the reflected light into an electric signal, the target area being irradiated with light by a light emitting circuit;
a signal processing circuit configured to perform signal processing based on the electric signal output from each of the plurality of pixels;
a communication interface processing circuit configured to receive a communication interface signal necessary for control related to the signal processing from an external device;
a synchronization signal generation circuit configured to receive a synchronization signal for synchronization with the signal processing based on the communication interface signal;
a light emission trigger output circuit configured to transmit a light emission trigger for irradiation of the light emitting circuit with light based on the synchronization signal;
a synchronization signal processing circuit configured to: control the signal processing circuit based on the synchronization signal; and transmit the synchronization signal to a connectable external device; and
a feedback signal processing circuit configured to receive a feedback signal returned from the light emitting circuit in response to the light emission trigger; receive a feedback signal returned from the external device in response to the synchronization signal; and transmit a reception result in a state of being included in predetermined signal processing data to a control device that controls execution of the signal processing.

\* \* \* \* \*